United States Patent
Mensah et al.

(10) Patent No.: US 11,949,683 B2
(45) Date of Patent: Apr. 2, 2024

(54) GUEST ACCESS TO CONTROL DEVICES

(71) Applicant: Alarm.com Incorporated, Tysons, VA (US)

(72) Inventors: William Wireko Mensah, Fairfax, VA (US); Margarita Elena Bottlick, Woodbridge, VA (US); Ashish Sethi, Fairfax, VA (US)

(73) Assignee: Alarm.com Incorporated, Tysons, VA (US)

(*) Notice: Subject to any disclaimer, the term of this patent is extended or adjusted under 35 U.S.C. 154(b) by 239 days.

(21) Appl. No.: 17/375,343

(22) Filed: Jul. 14, 2021

(65) Prior Publication Data

US 2022/0021684 A1  Jan. 20, 2022

Related U.S. Application Data

(60) Provisional application No. 63/053,844, filed on Jul. 20, 2020.

(51) Int. Cl.
| | |
|---|---|
| *H04L 29/06* | (2006.01) |
| *H04L 9/40* | (2022.01) |
| *G06V 20/52* | (2022.01) |
| *H04N 7/18* | (2006.01) |
| *H04N 23/56* | (2023.01) |
| *H04N 23/71* | (2023.01) |
| *H04N 23/90* | (2023.01) |

(52) U.S. Cl.
CPC ........ *H04L 63/105* (2013.01); *H04L 63/0853* (2013.01); *G06V 20/52* (2022.01); *H04N 7/18* (2013.01); *H04N 23/56* (2023.01); *H04N 23/71* (2023.01); *H04N 23/90* (2023.01)

(58) Field of Classification Search
CPC ............. H04L 63/105; H04L 63/0853; H04L 63/0807; H04L 63/107; H04L 63/20; H04N 7/18; H04N 23/56; H04N 23/71; H04N 23/90; G06V 20/52
See application file for complete search history.

(56) References Cited

U.S. PATENT DOCUMENTS

| | | | |
|---|---|---|---|
| 10,134,212 B1* | 11/2018 | Ren ..................... | G07C 9/00896 |
| 11,113,374 B2* | 9/2021 | Kanteti ................. | H04W 4/80 |
| 2012/0124651 A1* | 5/2012 | Ganesan ................ | H04L 63/18 |
| | | | 726/4 |

(Continued)

OTHER PUBLICATIONS

Burglars' IoT Paradise: Understanding and Mitigating Security Risks of General Messaging Protocols on IoT Clouds, Jia et al, May 2020 (Year: 2020).*

*Primary Examiner* — Jahangir Kabir
(74) *Attorney, Agent, or Firm* — Fish & Richardson P.C.

(57) ABSTRACT

A method for granting guest access to a control device includes detecting, by a monitoring control unit, a new connection of a guest device to a network, transmitting, by the monitoring control unit and to an authorized device, a request to grant access to the guest device to control a monitoring system, in response to the request, receiving, by the monitoring control unit, approval to grant access to the guest device to control the monitoring system, and in response to the approval, transmitting, by the monitoring control unit and to the guest device, (i) data that allows the guest device to access a web service and (ii) a temporary authentication token.

20 Claims, 4 Drawing Sheets

(56) References Cited

U.S. PATENT DOCUMENTS

| | | | | |
|---|---|---|---|---|
| 2012/0210011 A1* | 8/2012 | Liu | .................... | H04W 12/082 |
| | | | | 709/229 |
| 2016/0359874 A1* | 12/2016 | Black | ...................... | H04L 63/02 |
| 2017/0193723 A1* | 7/2017 | Park | ........................ | E05B 49/00 |
| 2020/0100106 A1* | 3/2020 | Black | .................. | H04L 63/0209 |

* cited by examiner

300

GUEST ACCESS TO CONTROL DEVICES

CROSS-REFERENCE TO RELATED APPLICATION

This application claims the benefit of U.S. Provisional Application No. 63/053,844, filed Jul. 20, 2020, and titled "Guest Access Devices," which is incorporated by reference.

TECHNICAL FIELD

This disclosure application relates generally to property monitoring technology.

BACKGROUND

When a person is away from their home, that person may wish to allow a guest or other authorized person into their home or to make a change to an appliance or setting of a system of the home.

SUMMARY

Techniques are described for property monitoring technology. Monitoring systems for properties generally allow for administrators and/or primary account holders to grant other users access to smart home devices within a property such as a thermostat or the lights but require that the administrators create a secondary account or profile with a separate set of credentials. For residents in the home or other people within a property, this process can be useful, but for guests or other people who may or may not be inside of the property and/or who will not be staying for an extended period and to whom an administrator does not want to grant long-term access, this process can be convoluted and take too long.

Techniques are described for taking action in a monitoring system to identify new users who are determined to be inside of a property and providing an authorized user with the option of granting the new user authorization to provide commands to the monitoring system. The system provides a quick and streamlined process for guests to control devices within a property without the need to create a secondary login, to show the guest where the devices are, or to explain to the guest how the devices work. For example, commands provided without authentication information may enable seamless integration of scenes, or various configurations of home automation or settings of systems within the home, and/or actions, with monitoring systems. A system uses sensor data collected from a monitoring system of a property, including motion sensor data, microphones, cameras, network connectivity data, etc., to determine the current state of the home. In this example, techniques may include using seamless commands for integrating scenes, or various configurations of home automation, with monitoring and/or security systems.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Figure 1:
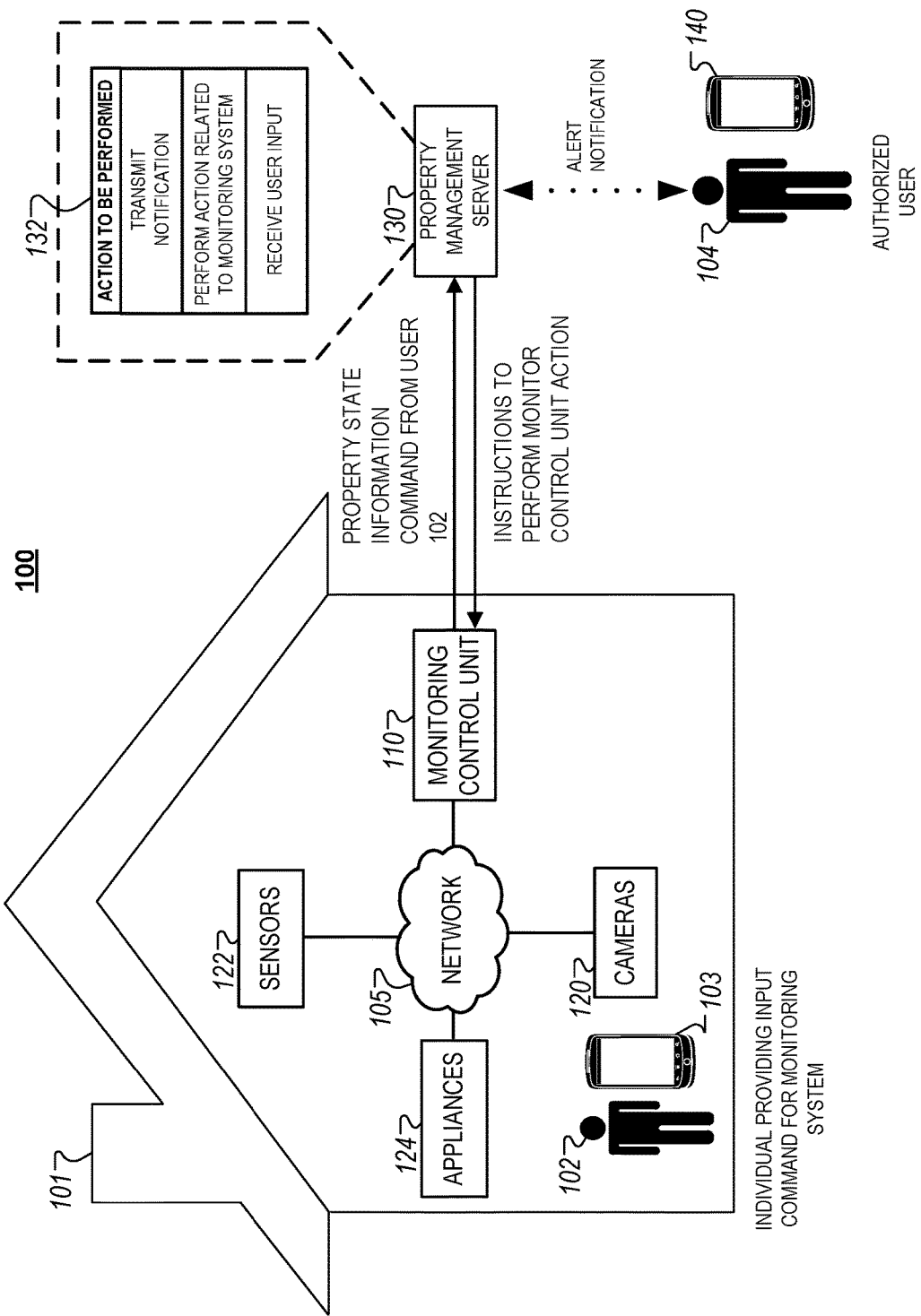
FIGS. 1-2 illustrate systems that allow control of a monitoring system based on commands provided by a user granted temporary access to the monitoring system.

FIG. 1 illustrates a diagram of an example of an integrated system 100 associated with a property 101. In some examples, the system can be used to control systems and appliances of the property 101. While the following description is drafted in the context of a home, it is understood that the disclosure can be directed to various types of property, such as office buildings, public buildings, etc. Additionally, while the following disclosure is directed to a monitoring system that controls devices communicably coupled to the monitoring system, it is understood that the disclosure can be directed to monitoring systems or security systems that do not control devices communicably coupled to the monitoring system. For example, the disclosure may be applicable to monitoring systems that include sensors and cameras and do not include smart lights, smart locks, or controllable heating, ventilation and air conditioning (HVAC) units.

System 100 allows people other than the homeowner or another authorized user associated with property 101 to provide commands to the monitoring system. For example, system 100 allows a guest to provide commands to the monitoring system and/or control various appliances and settings within property 101 even while the homeowner is not currently home.

The property 101 may include various monitoring devices. For example, the property 101 may include cameras, sensors, and other devices that provide monitoring data associated with devices and areas of the property 101. Cameras located on the property 101 may provide video, still images, or other monitoring data, and may provide data via a live feed, transmit data to be stored in a remote location, store data locally for review at a later time, etc. Sensors located on the property 101 may include motion sensors, heat sensors, pressure sensors, resistive sensors, etc. Sensors may communicate with the monitoring control unit 110 and transmit monitoring data for processing to the monitoring control unit 110. In some examples, sensors located on the property 101 may store collected data locally or transmit monitoring data to be stored in a remote location.

The system 100 may include a monitoring control unit 110, one or more cameras 120, one or more sensors 122, one or more appliances 124, a property management server 130 that manages monitoring system data received from the monitoring control unit, and an authorized user device 140. The server 130 may maintain data that defines which users are authorized users 104, which devices are authorized user devices 140, and what actions related to a monitoring system of the property 101 to take based on received data.

An individual 102 may wish to input a command to the monitoring system. The individual 102 is not the same as the authorized user 104, and in some examples is unauthorized.

For example, individual 102 may be a guest of authorized user 104 or a service provider, among other types of individuals.

The monitoring control unit 110 includes a controller and a network module. The controller is configured to control a monitoring system (e.g., a home alarm or security system) that includes the monitoring control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitoring control unit 110.

The network module is a communication device configured to exchange communications over a network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitoring control unit 110 to communicate over a local area network and/or the Internet. The network module also may be a voice-band modem configured to enable the alarm panel to communicate over the telephone lines of Plain Old Telephone Systems (POTS).

In some examples, the network module implements a service that scans the network 105 of property 101. For example, network 105 can be a Wi-Fi network within the home. The network module can scan network 105 for new connections from mobile devices. For example, the network module can scan network 105 for new connections from cell phones of guests within property 101. In one example, the network module can generate a background process, such as a daemon, to listen for new network connections. When a new connection is detected, the service can provide a notification to a device of an authorized user to alert the user that a guest device has connected to the network 105. For example, when the network module detects a new connection, the service can provide a notification to a mobile device 140 of authorized user 104 alerting authorized user 104 that a guest device 103 has connected to Wi-Fi network 105. The notification can ask if authorized user 104 would like to grant the guest 102 access to provide commands to the monitoring control system and other appliances and systems within property 101.

In some examples, the monitoring control unit 110 may include data capture and recording devices. In these examples, the monitoring control unit 110 may include the cameras 120, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitoring control unit 110 may be configured to communicate with the cameras 120, the sensors 122, the appliances 124, and other devices and systems of the property 101 through a network 105. In some examples, the monitoring control unit 110 may communicate with the cameras 120, the sensors 122, the appliances 124, and other devices and systems of the property 101 directly. For example, the monitoring control unit 110 may directly receive data from the sensors 122, send control signals to the appliances 124, etc. The monitoring control unit 110 may be configured to communicate with the server 130. In some examples, the monitoring control unit 110 may be configured to communicate with the server 130 through the network 105. In some examples, the monitoring control unit 110 may be configured to communicate with the server 130 directly.

The monitoring control unit 110 also may include a communication module that enables the monitoring control unit 110 to communicate with other devices of the system 100. The communication module may be a wireless communication module that allows the monitoring control unit 110 to communicate wirelessly. For instance, the communication module may be a Wi-Fi module that enables the monitoring control unit 110 to communicate over a local wireless network at the property 101. The communication module further may be a 900 MHz wireless communication module that enables the monitoring control unit 110 to communicate directly with other devices of the system 100. Other types of short-range wireless communication protocols, such as Bluetooth, Bluetooth LE, Z-Wave, ZigBee, etc., may be used to allow the monitoring control unit 110 to communicate with other devices in the property 101.

The monitoring control unit 110 further may include processor and storage capabilities. The monitoring control unit 110 may include any suitable processing devices that enable the monitoring control unit 110 to operate applications and perform the actions described throughout this disclosure. In addition, the monitoring control unit 110 may include solid state electronic storage that enables the monitoring control unit 110 to store applications, configuration data, collected sensor data, and/or any other type of information available to the monitoring control unit 110.

The monitoring control unit 110 may exchange communications with the sensors 122, the appliances 124, the cameras 120, and the property management server 130 using multiple communication links. The multiple communication links may be a wired or wireless data pathway configured to transmit signals from sensors 122, the appliances 124, the cameras 120, and the property management server 130 to the controller. The sensors 122, the appliances 124, the cameras 120, and the property management server 130 may continuously transmit sensed values to the controller, periodically transmit sensed values to the monitoring control unit 110, or transmit sensed values to the monitoring control unit 110 in response to a change in a sensed value.

The multiple communication links may include a local network. The sensors 122, the appliances 124, the cameras 120, the property management server 130, and the monitoring control unit 110 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the monitoring control unit 110 may additionally be used to perform routine surveillance operations on a property. For instance, the monitoring control unit 110 may be assigned to one or more particular properties within a geographic location and may routinely collect surveillance footage during specified time periods (e.g., after dark), which may then be transmitted to the property management server 130 for transmitting back to each particular property owner. In such implementations, the property owner may receive the surveillance footage over the network 105 as a part of a service provided by a security provider that operates the property management server 130. For example, transmissions of the surveillance footage collected by the monitoring control unit 110 may be part of a premium security service package provided by a security provider in addition to the routine drone emergency response service.

In some implementations, the monitoring control unit 110 may monitor the operation of the electronic devices of the system 100 such as sensors 122, the appliances 124, the cameras 120, and the property management server 130. For instance, the monitoring control unit 110 may enable or disable the devices of the system 100 based on a set of rules associated with energy consumption, user-specified settings, and/or other information associated with the conditions near or within the property 101 where the system 100 is located. In some examples, the monitoring control unit 110 may be used as a replacement to a traditional security panel (or monitoring control unit) that is used to monitor and control the operations of the system 100. In other examples, the monitoring control unit 110 may coordinate monitoring operations with a separate security panel of the system 100. In such examples, the monitoring control unit 110 may monitor particular activities of the devices of the system 100 that are not monitored by the security panel, or monitor the operation of particular devices that are not monitoring by the security panel.

In some examples, a monitoring system may not be used. In these examples, the systems and devices within the property 101 (e.g., the cameras 120, the sensors 122, the appliances 124, etc.) communicate directly with the server 130 over a long-range communication protocol. For example, the systems can communicate directly with the server 130 over a protocol such as the Global System for Mobile Communications (GSM).

The network 105 is configured to enable exchange of electronic communications between devices connected to the network 105. For example, the network 105 may be configured to enable exchange of electronic communications between the monitoring control unit 110, the sensors 122, the appliances 124, the cameras 120, and the property management server 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The system 100 includes one or more cameras 120. In some examples, the cameras 120 are part of the monitoring system for the property 101. The cameras 120 may be video/photographic cameras or other type of optical sensing devices configured to capture images. For instance, the cameras 120 may be configured to capture images of an area within a building monitored by the monitoring control unit 110. The cameras 120 may be configured to capture single, static images of the area and also video images of the area in which multiple images of the area are captured at a relatively high frequency (e.g., thirty images per second). The cameras 120 may be controlled based on commands received from the monitoring control unit 110.

The cameras 120 may be triggered by several different types of techniques. For instance, a passive infrared (PIR) motion sensor may be built into the cameras 120 and used to trigger the cameras 120 to capture one or more images when motion is detected. The cameras 120 also may include a built-in microwave motion sensor and used to trigger the cameras 120 to capture one or more images when motion is detected. The cameras 120 may have a "normally open" or "normally closed" digital input that can trigger capture of one or more images when external sensors (e.g., the sensors 122, PIR, door/window, etc.) detect motion or other events. In some implementations, the cameras 120 receive a command to capture an image when external devices detect motion or another potential alarm event. The cameras 120 may receive the command from the controller or directly from one of the sensors 122.

In some examples, the cameras 120 trigger integrated or external illuminators (e.g., infrared, Z-wave controlled "white" lights, etc.) to improve image quality when the image is dark. An integrated or separate light sensor may be used to determine if illumination is desired and may result in increased image quality.

The cameras 120 may be programmed with any combination of time/day schedules, system "arming state", or other variables to determine whether images should be captured or not when triggers occur. The cameras 120 may enter a low-power mode when not capturing images. In this case, the cameras 120 may wake periodically to check for inbound messages from the controller. The cameras 120 may be powered by internal, replaceable batteries if located remotely from the monitoring control unit 110. The cameras 120 may employ a small solar cell to recharge the battery when light is available. Alternatively, the cameras 120 may be powered by the controller's 112 power supply if the cameras 120 is co-located with the controller.

In some implementations, the cameras 120 communicates directly with the property management server 130 over the Internet. In these implementations, image data captured by the cameras 120 does not pass through the monitoring control unit 110 and the cameras 120 receives commands related to operation from the property management server 130. The cameras 120 can record both audio and visual data. For example, the cameras 120 can be used to capture images or voice recordings of guests for purposes of authentication to an authorized user.

The system 100 also includes one or more sensors or detectors. For example, the monitoring system may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The authorized device 140 can include a monitoring control application. In some examples, the monitoring control application is associated with the monitoring system for the property 101. The monitoring control application may be a software/firmware program configured to run on various devices that enables the user interface and features described throughout. The authorized device 140 may load or install the monitoring control application based on data received over a network (e.g., the network 105) or data received from local media. The monitoring control application runs on mobile device platforms. The monitoring control application also enables the authorized device 140 to receive and process image and sensor data from the monitoring system.

In some implementations, the authorized device 140 communicates with and receives monitoring system data from the monitoring control unit 110 using a communication link. For instance, the authorized device 140 may communicate with the monitoring control unit 110 using various local wireless protocols such as Wi-Fi, Bluetooth, Z-Wave, ZigBee, HomePlug (Ethernet over powerline), or wired protocols such as Ethernet and USB, to connect the authorized device 140 to local security and automation equipment. The authorized device 140 may connect locally to the monitoring system and sensors 122 and other devices. The local connection may improve the speed of status and control communications because communicating through a network, such as the Internet or the network 105 with a remote server (e.g., the property management server 130) may be significantly slower.

Although the authorized device 140 is shown as communicating with the property management server 130, the authorized device 140 may also communicate directly with the monitoring control unit 110, the cameras 120, the sensors 122, the appliances 124, and other devices controlled by the monitoring control unit 110 when the authorized device 140 is near the property 101. For example, the authorized device 140 may exchange communications with the devices of the system 100 over the network 105.

In some implementations, the authorized device 140 receives monitoring system data captured by the monitoring control unit 110 through the network 105. The authorized device 140 may receive the data from the monitoring control unit 110 through the network 105, or the property management server 130 may relay data received from the monitoring control unit 110 to the authorized device 140 through the network 105. In this regard, the property management server 130 may facilitate communication between the authorized device 140 and the monitoring system.

Although FIG. 1 illustrates one property for brevity, the server 130 may manage monitoring systems and monitoring control units for many more properties and/or structures. For example, the system 100 may include several monitoring systems each associated with a respective multiple, different properties and the server 130 may manage actions, users, and devices for each of the different properties. The multiple, different properties may be owned by the same entity. For example, a single person may own all of the properties. In some examples, the multiple, different properties may be operated by different entities (e.g., owned by different entities) with single entities operating groups of properties. For example, each property may be a rental property owned by a different person, and a single property management company may be managing all of the rental properties using the system. In some examples, the property 101 is a commercial or industrial property, such as a restaurant or a factory.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some examples, the appliances 124 may include kitchen appliances, such as stoves, ranges, exhaust fans, ovens, etc. In some instances, the appliances 124 may periodically transmit information and/or generated data to the monitoring control unit 110 such that the monitoring control unit 110 can automatically control the operation of the appliances 124 based on the exchanged communications. For example, the monitoring control unit 110 may operate one or more of the appliances 124 based on a fixed schedule specified by the user. In another example, the monitoring control unit 110 may enable or disable one or more of the appliances 124 based on received sensor data from the sensors 122.

The property management server 130 is an electronic device configured to provide monitoring services by exchanging electronic communications with the monitoring control unit 110 and the authorized device 140 over a network (e.g., network 105) such as the Internet, a LAN, etc. For example, the property management server 130 may be configured to monitor events (e.g., events that are used to determine the state of the property 101) generated by the monitoring control unit 110. In this example, the property management server 130 may exchange electronic communications with the network module included in the monitoring control unit 110 to receive information regarding events (e.g., alarm events) detected by the monitoring control unit 110. The property management server 130 also may receive information regarding events from the authorized device 140.

In some implementations, the property management server 130 may route alarm data received from the network module or the authorized device 140 to a central alarm station server that is maintained by a third-party security provider. The alarm data can include captured video footage of the detected individual within a specific area of the property 101, which is processed by the third-party security provider to request emergency assistance to the property 101. For example, the alarm data can be transmitted to law enforcement to indicate a potential security breach within the property 101. In some instances, the alarm data can also include metadata identified by the monitoring control unit 110 within the captured video footage (e.g., gender of the individual, suspected identity of the individual, key physical attributes, etc.). In these examples, the alarm data can either be transmitted to law enforcement after requesting confirmation from the user 104, or automatically transmitted without intervention from the user 104. In some implementations, the user 102 can acknowledge the alarm data and dismiss the alarm data, reducing the number of false alarms.

The property management server 130 may store sensor and image data received from the monitoring control unit 110 and perform analysis of the sensor and image data. Based on the analysis, the property management server 130 may communicate with and control aspects of the monitoring control unit 110 or the authorized device 140.

The operations performed by the system 100 may enhance safety when using kitchen appliances. In some examples, the server 130 receives state information for the property 101. The state information may be used to determine a scene to be applied to the property 101 or an action or actions to be performed. For example, if it is nighttime and occupancy is detected in bedrooms of the house, but no motion is detected, the scene may be a "Good night" scene in which the owners of the property 101 are home, but are asleep. The server 130 may provide a web interface that enables users (e.g., residents of the property 101, monitoring system operators, authorized users, etc.) to manage alerts, notifications, and monitoring system actions (e.g., contacting emergency responders, controlling appliances 124 in the property 101, analyzing monitoring system data collected by the monitoring control unit 110, etc.). In these implementations, the server 130 further receives data related to settings for the monitoring system controlled by the monitoring control unit 110.

The server 130 may provide a web interface that enables a user to define operational settings for the property 101 (e.g., alert profiles, energy management profiles, thermostat profiles, rules related to use of the appliances 124, etc.). In some examples, the individual inputting a command for the monitoring system with which no authentication information is provided 102 may define and update settings for appliances, devices, and systems of the property 101. In some examples, the authorized user 104 may make changes to settings and profiles for appliances, devices, and systems of the property 101 through the authorized device 140.

In general, the system 100 can be configured to respond to a command with which no authentication information was provided and input by the user 102. For example, the individual 102 can input a command by pressing a button on a thermostat of the property 101 to change the temperature of the property 101.

The server 130 may include actions 132 available in response to commands with which no authentication information was provided and input by the user 102. For example, in response to data received from the monitoring control unit 110 indicating that the user 102 provided a voice command to open a garage door of the property 101, the server 130 may access the available actions 132 and determine that it is necessary to transmit an alert to the authorized device 140. In some examples, the server 130 may transmit the alert directly to the authorized device 140. In some examples, the server 130 may transmit instructions to the monitoring control unit 110 to send the alert to the authorized device 140. In some examples, the server 130 may transmit instructions to the monitoring control unit 110 to perform an action related to the monitoring system of the property 101. In some examples, the server 130 may transmit control signals directly to a system or device of the monitoring system.

In the example depicted in FIG. 1, the monitor control unit 110 receives property state information from the various appliances and systems within the property 101, such as the sensors 122, the appliances 124, the cameras 120, etc. The property state information may include data such as occupancy data, a state of the monitoring system of the property 101, image data from the cameras 120, etc., and can be used to determine various scenes for the property 101. For example, if it is day time and a security system of the property 101 is armed, the server 130 may determine that an "Away at work" scene should be applied to the property 101, and that actions 132 are determined based on the "Away at work" scene. The monitor control unit 110 then receives a command with which no authentication information was provided and input by the user 102.

In this particular example, the monitor control unit 110 may then analyze the property state information against rules for the "Away at work" scene related to the command input by the user 102. After analyzing the property state information, the server 130 accesses the available actions 132 to determine an appropriate action to be performed based on the "Away at work" scene. After determining an appropriate action to be performed, the property management server 130 transmits instructions to perform the action to be performed to the monitoring control unit 110, which then transmits corresponding signals to one or more of the cameras 120, sensors 122, or the appliances 124. In some instances, the action to be performed may include transmitting an event notification indicating the command input by the user 102 and other associated data to the authorized device 140 of the authorized user 104.

The server 130 may maintain a database that stores property state information (e.g., typical patterns of property usage data including appliance 124 usage data, occupancy data, thermostat usage data, etc.). In some examples, the server 130 or the monitoring control unit 110 maintains the property usage data. The server 130 may analyze the property usage data to provide alerts/reports based on both events related to the command input by the user 102 and property usage data. For example, the server 130 may monitor the cameras 120 of the property 101 to determine whether the user 102 is an authorized user, and whether to issue an alert that the stove is still on.

The server 130 may communicate with the monitoring control unit 110 to control operations of devices and systems located on the property 101. For example, if the command input by the user 102 is to disarm the security system of the property 101, and the current state of the property 101 will allow disarming the security system without authentication, the monitor control unit 110 may disarm the security system.

The devices 103 and 140 may be electronic devices associated with a property owner or an occupant that exchange network communications over a network, such as the Internet or the network 105. For example, the authorized device 140 may be smartphones, tablets, personal computers (PCs), network-enabled media players, home entertainment systems, cloud storage devices, and other types of network devices. The authorized device 140 may access a service made available by the property management server 130 on the network 105, such as a mobile application. The data generated by the authorized device 140 may include over the network 105, which may be monitored by the monitoring control unit 110.

The system 100 intelligently leverages the property state information and the monitoring control unit 110 to aid in security monitoring and property automation. For example, the monitoring control unit 110 may aid in investigating alarm events detected at the property 101 through an analysis of property state information against one or more rules related to the command input by the user 102. In this example, the property state information may indicate that it is nighttime and all authorized occupants of the property 101 are asleep, and that a window in the kitchen has been opened with no activity from inside the kitchen detected. The sensors 122 for that particular kitchen window may transmit the data to the monitoring control unit 110, which may then transmit the information to the server 130. The server 130 may use the available actions 132 to determine that the police department needs to be notified.

Examples of implementations of the system 100 can use various types of data captured devices within the property 101 (e.g., the cameras 120, the sensors 122, the appliances 124, etc.) to perform different actions based on the present conditions of the property 101. In some instances, the notifications transmitted by the server 130 may be based on the property state information of the property 101. For example, the server 130 may transmit a notification to all users and devices associated with the property 101 in response to data from the monitor control unit 110 indicating a button press to open the garage door when the security system is armed (e.g., no one is home, everyone is asleep, etc.), whereas the server 130 may transmit a notification only to an administrator user in response to property state data indicating a breach within the property 101 when the security system is unarmed. In other examples, the server 130 may transmit a high-priority alert if the security status of the property 101 is set to an "Alarmed" mode. For example, if a pet in the property 101 has opened a door while owners of the property 101 are at work, the monitoring control unit 110 may receive data indicating the door open event, and may transmit the data to the server 130. The server 130 can transmit an image taken by a camera 120 within the property 101 along with a high-priority alert.

In some implementations, the property management server 130 can transmit instructions to the monitoring control unit 110 to adjust one or more settings associated with the devices within the property 101. For instance, in response to the door open event, the monitoring control unit 110 may receive instructions from the server 130 to close the door and send an alert to the owners of the property 101. In such instances, the particular instructions received by the monitoring control unit 110 can be varied based on the current state of the property 101. For example, John may prefer that the door be locked after it is closed, whereas Susan may simply want the door to be closed.

In some implementations, where the property management server 130 transmits notifications to the authorized device 140, the particular notification transmitted can be based on the location of the authorized device 140. For example, a notification can be prevented from being transmitted if the authorized device 140 is near or with the property 101. In other examples, the property management server 130 can transmit notifications to another remote user if the authorized device 140 is located within the property 101.

In some implementations, the server 130 determines the particular action to be performed in response to a command input by the user 102 based on monitoring one or more parameters indicated by the data transmitted from the monitoring control unit 110. For instance, as described more particularly with respect to FIGS. 2-5, the available actions 132 can specify different actions to be performed based on the current state of the property 101 and at least one of: the status of a device 103 from which a command is received, occupancy information gathered by the devices within the property 101, the security status indicated by a security system of the property 101, etc. In some implementations, the available actions 132 are defined by a scene applied to the property 101. In some implementations, the available actions 132 are defined by the server 130. More particular descriptions related to the components of the system 100 are provided below.

Figure 2:
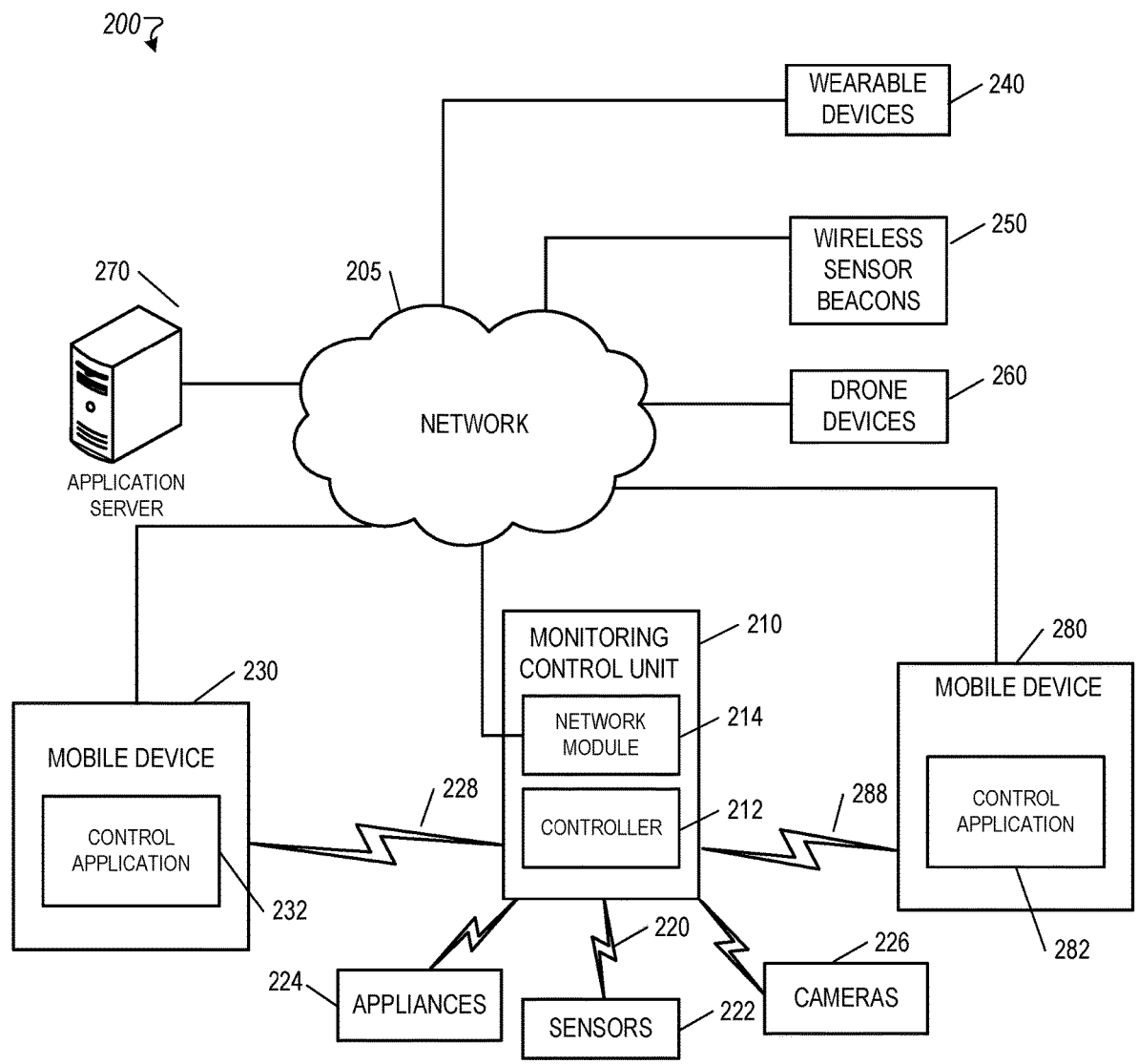

FIG. 2 illustrates a diagram of an example of an integrated system 200. In some examples, the system 200 is an example of the system 100. The system 200 may include a network 205, a monitoring control unit 210, one or more sensors 222, one or more mobile devices 230 and 280, one or more wearable devices 240, one or more beacons 250, one or more drone devices 260, and an application server 270. The network 205 may be configured to enable electronic communications between devices connected to the network 205. For example, the network 205 may be configured to enable exchange of electronic communications between the monitoring control unit 210, the sensors 222, the appliances 224, the cameras 226, the mobile device 230, the wearable devices 240, the beacons 250, the drone devices 260, and the application server 270. The network 205 may be similar to the network 105 described with respect to FIG. 1.

The monitoring control unit 210 may include a controller 212 and a network module 214. The controller 212 may be similar to the controller of the monitoring control unit 110 as described with respect to FIG. 1. The network module 214 may be similar to the network module of the monitoring control unit 110 as described with respect to FIG. 1.

The sensors 222 may be similar to the sensors 122 as described with respect to FIG. 1. The sensors 222 may include cameras, pressure sensors, temperature sensors, motion sensors, occupancy sensors, or device sensors that may communicate with the monitoring control unit 210 over the communication link 220. For example, the sensors 222 may provide the monitoring control unit 210 sensor data indicating when users left a home, when users arrived home, what users are home, what users were doing before they left the home and an appearance of users when they left the home.

In other implementations, the sensors 222 may include motion sensors, pressure sensors, or other sensors that determine occupancy and usage of appliances/features within the property. For example, in one instance, motion and temperature sensors may be placed on the walls within a room to determine if a person is currently occupying or not occupying the room. In another instance, the sensors 222 may be placed on particular objects and/or appliances to monitor user activity and user safety within a property. For example, touch sensors may be placed on common appliances such as, for e.g., an oven, a stove, a blender, a space heater, which may cause personal injuries to users. In some implementations, the sensors 222 within the property may collect user activity data based on proximity with the wearable devices 240 to track user movement within the property. In another example, the sensors 222 may only collect user activity data when the user is located within the property based on location data transmitted from the wearable devices 240 indicating that the user is within a particular distance (e.g., 5 meters) from the sensors 222.

The one or more mobile devices 230, 280 may be devices that host one or more native applications, e.g., the monitoring control application 232. The mobile devices 230 may be similar to the authorized device 140 as described with respect to FIG. 1. The mobile devices 230 may be cellular phones or non-cellular locally networked devices. The mobile devices 230 may include a cell phone, a smart phone, a tablet PC, a personal digital assistant ("PDA"), or any other portable device configured to communicate over a network. For example, implementations also may include portable music players, other communication devices, and handheld or portable electronic devices for gaming, communications, and/or data organization. The mobile devices 230 may be the same or may include mobile devices of different types. The mobile devices 230 may perform functions unrelated to the monitoring platform 200, such as placing personal telephone calls, playing music, playing video, displaying pictures, browsing the Internet, maintaining an electronic calendar, etc.

In some implementations, the control applications 232 and 282 can be web applications that are accessible over network 205. For example, the control applications 232 and 282 can be websites accessible over network 205. In some implementations, the control applications 232 and 282 are the same application. For example, control applications 232 and 282 can be the same native application or website.

In some implementations, the devices 230, 280 may communicate with and receive data from the monitoring control unit 210 using the communication links 228, 288. For instance, the devices 230, 280 may communicate with the monitoring control unit 210 using various local wireless protocols, such as Wi-Fi, Bluetooth, Z-Wave, ZigBee, HomePlug (Ethernet over power line), or wired protocols such as Ethernet, USB, and other wired protocols based on the RS232, RS485, and/or RS422 standards. The devices 230, 280 may connect locally to the monitoring platform 200, its sensors, and other devices. The local connection may improve the speed of communications because communicating through the network 205 with a remote server, e.g., the application server 270, may be slower.

Although the devices 230, 280 are shown communicating with the monitoring control unit 210, the devices 230, 280 may communicate directly with the sensors 222, the appliances 224, the cameras 226, the wearable devices 240, the beacons 250, the drone devices 260, and other devices controlled by the monitoring control unit 210. In some implementations, the devices 230, 280 may replace the monitoring control unit 210 and perform the functions of the monitoring control unit 210 for local control and long range or offsite communication.

In other implementations, the devices 230, 280 may receive data captured by the monitoring control unit 210 through the network 205. The devices 230, 280 may receive the data from the monitoring control unit 210 through the network 205 or the application server 270 and may relay data received from the monitoring control unit 210 to the devices 230, 280 through the network 205. In this regard, the application server 270 may facilitate communications between the devices 230, 280 and the monitoring control unit 210.

Although the devices 230, 280 are shown in FIG. 2 as being connected to the network 205, in some implementations, the devices 230, 280 are not connected to the network 205. In these implementations, the devices 230, 280 may communicate directly with one or more of the monitoring platform 200 components and no network connection, e.g., connection to the Internet, or reliance on remote servers is needed.

In some implementations, the devices 230, 280 may be able to determine a geographic location associated with the devices 230, 280, and may communicate information identifying a geographic location associated with the devices 230, 280 to the sensors 222 or the wearable devices 240. For example, the devices 230, 280 may determine the current geographic location of the devices 230, 280 by using global positioning system (GPS) capabilities. In other implementations, a geographic location associated with the devices 230, 280 may be determined using other methods, for example, by using Wi-Fi access point triangulation data, cellular network triangulation data, or IP address information, when the devices 230, 280 have network connectivity. The devices 230, 280 may additionally or alternatively transmit data identifying the geographic location of the devices 230, 280 over the network 205 to the application server 270, or to the monitoring control unit 210.

The devices 230, 280 may each include a native application 232, 282 respectively. The native applications 232, 282 refer to a software/firmware program running on the corresponding mobile devices that enables the safety monitoring features described within this disclosure. The devices 230, 280 may load or install the native applications 232, 282 based on data received over a network or data received from local media. The native monitoring applications 232, 282 may run on mobile devices' platforms, such as Apple iOS, iPhone, iPod touch, Blackberry, Google Android, Windows Mobile, etc.

The native applications 232, 282 identify and display user data such as, for e.g., a geographic location associated with the devices 230, 280 and communicate information identifying the geographic location to various devices within the monitoring platform 200 such the sensors 222, the wearable devices 240, or the monitoring control unit 210. In some instances, the native application 232 may also transmit user data to the application server 270. For example, the devices 230, 280 having the native applications 232, 282 may determine a geographic location of the devices 230, 280 using GPS capabilities, and may communicate data identifying the geographic location to the application server 270. In some instances, the native applications 232, 282 may check the location of the devices 230, 280 periodically and may automatically detect when a user associated with the devices 230, 280 is going toward or away from a property.

The wearable devices 240 may be portable electronic devices that may be incorporated into items of clothing and accessories worn by a user. The wearable devices 240 may be activity trackers, smartwatches, smart glasses, handhelds, bracelets, necklace pendants, or any wearable device configured to communicate over a network. The wearable devices 240 may include devices of different types. The wearable devices 240 may perform functions unrelated to the monitoring platform 200, such as monitoring user activity data such as, for e.g., biometric data, fitness data, sleep data, user-inputted data, and any other type of quantitative data. The wearable devices 240 may constantly monitor and process data transmitted between the components of the monitoring platform 200 such as, e.g., the monitoring control unit 210, the sensors 222, or the mobile devices 230.

In some implementations, the wearable devices 240 may function independently of the components of the monitoring platform 200 and include a separate network module that enables the wearable devices 240 to connect to the components of the monitoring platform 200 by exchanging wireless communications over the network 205. For instance, the wearable devices 240 may include one or more GSM modules, a radio modem, a cellular transmission mode, or any type of module configured to exchange communications in the following formats: LTE, GSM or GPRS, CDMA, EDGE, EGPRS, EV-DO or EVDO, UMTS, or IP. In other instances, the wearable devices may be capable of using various local wireless protocols, such as Wi-Fi, ANT, Bluetooth, Z-Wave, ZigBee, HomePlug (Ethernet over powerline), or wired protocols such as Ethernet, USB, and other wired protocols based on the RS232, RS485, and/or RS422 standards. For example, the wearable devices 240 may transmit measured data to the mobile devices 230 over a local wireless protocol and the mobile devices 230 may then transmit the data received by the wearable devices 240 to the application server 270.

The one or more wireless sensor beacons 250 can be devices capable of emitting and/or receiving information over a wireless communication channel. For example, the wireless sensor beacons 250 may utilize Bluetooth Low Energy (BLE), also known as Bluetooth Smart, or other wireless technologies such as, for e.g., Wi-Fi, near-field communications (NFC), or other wireless technologies, to communicate with the devices connected over the network 205. The wireless sensor beacons 250 may be commercially available beacon devices or other types of beacon devices. The wireless sensor beacons 250 may communicate with the devices of the monitoring platform 205 by emitting messages (e.g., pings) that include information identifying the wireless sensor beacons 250.

In some implementations, devices of the monitoring platform 200 such as the mobile devices 230, 280 and the wearable devices 240 may communicate with the wireless sensor beacons 250 by receiving message from the one or more wireless sensor beacons 250 identifying one or more of the wireless sensor beacons 250. For example, each of the one or more wireless sensor beacons 250 may be associated with a unique universal identifier (UUID) that identifies a particular wireless sensor beacon within a group of two or more wireless sensor beacons within a particular geographic location, for e.g., a shopping complex.

In some implementations, a particular wireless sensor beacon 250 may be associated with particular regions within a geographic location, for e.g., particular floors or individual shops within a shopping complex, to monitor user data by exchanging communications with nearby one or more mobile devices 230, 280 or wearable devices 240. For example, one or more wireless sensor beacons 250 may be placed within multiple floors of a shopping complex, each with different UUIDs and a particular set of latitude and longitude coordinates that are associated with a defined region (e.g., a section within a store, an outdoor area, a building, a venue or other space).

Each of the one or more wireless sensor beacons 250 may broadcast information to allow the devices of the monitoring platform 200 to recognize the one or more of the wireless sensor beacons 250. In some instances, the one or more wireless sensor beacons 250 broadcast their information periodically for particular periods of time (e.g., every second, every millisecond). The one or more wireless sensor beacons 250 may broadcast this information using wireless communications protocols such as, for e.g., BLE. In some implementations, information broadcasted by the one or more wireless sensor beacons 250 may also be broadcasted on particular frequencies or power levels to control the types of devices on the monitoring platform 200 that receive the information. For example, the one or more wireless sensor beacons 250 may transmit information to the mobile devices 230 and the wearable devices 240, on different frequencies, respectively.

In some implementations, the one or more wireless sensor beacons 250 may be placed in common regions that experience high user traffic volumes such as, for e.g., a public park, a tourist attraction, a public transportation station, a commercial complex, or other types of highly populated locations. In such implementations, the one or more wireless sensor beacons 250 may be configured with third-party electronic transportation or safety platforms to transmit information to the devices connected to the monitoring platform 200. For example, the one or more wireless sensor beacons 250 may detect a hazardous condition on a subway line based on receiving safety signals from the transportation authority and in response, transmit this information to the mobile devices 230 or the wearable devices 240.

In some implementations, the one or more wireless sensor beacons 250 may be configured to operate with a particular mobile application that is installed on the devices connected to the monitoring platform 200. For example, the particular mobile application may include a software development kit (SDK) that enables the devices connected to the monitoring platform to exchange communications with the one or more wireless sensor beacons 250. For instance, the different devices connected to the monitoring platform 200 may independently exchange communications with the one or more wireless sensor beacons 250. In such instances, a wearable device 240 may be able to transmit a distress signal including user data to the one or more wireless sensor beacons without the user having his/her mobile device with him. In other instances, the one or more wireless beacons 250 may receive redundant signal transmissions from the different devices connected to the monitoring platform 200 to ensure that distress signal is adequately transmitted to the application server 270 when one or more of the devices connected to the monitoring platform 200 malfunctions. For example, if a user is involved in a car crash that destroys his/her wearable device and mobile device, the monitoring platform 200 may determine that these devices are unable to transmit the distress signal and instead transmit a distress signal including cached data stored on other devices connected to the monitoring platform 200 such as the one or more wireless sensor beacon 250 or the drone devices 260.

In some implementations, the one or more wireless sensor beacons 250 may be connected to emergency call booths that enable the one or more wireless sensor beacons 250 to identify devices within a particular distance (e.g., 30 meters) when the devices transmit a distress signal to the monitoring platform 200. For example, the emergency call booths may monitor a particular frequency that includes the frequency of the outgoing distress signals transmitted by nearby devices. In response to detecting that a nearby device has transmitted a distress signal within a particular time period (e.g., 5 minutes), the particular wireless sensor beacon 250 that is connected to the emergency call may then transmit a signal including location information to the application server 270 or to an emergency responder, such as a fire department dispatch center.

The drone devices 260 may be unmanned devices that are capable of movement. For example, the drone devices 260 may be capable of moving throughout a location based on automated control technology and/or user input control provided by either the user or by the devices connected to the monitoring platform 200. In this example, the drone devices 260 may be able to fly, roll, walk, or otherwise move about a location. The drone devices 260 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft).

In some implementations, the drone devices 260 may be dispatched in response to an incident signal indicating that a user may require emergency assistance. For example, if a user has been injured during a known running route, the wearable device 240 may transmit data to the application server 270 from which the application server 270 may determine there is a likely safety incident, and in response, transmit an incident signal and a location of the user to an emergency responder and also transmit a dispatch instruction with the user location to the drone devices 260. The application server 270 may determine the location of the user during an incident based on comparing current data collected by the sensors 222, one or more mobile devices 230, 280, the wearable device 240, or the one or more wireless sensor beacons 250 to historical information about the user or user activity. In such examples, the monitoring platform 200 may deploy the drone devices 260 to the determined location. In some instances, the drone devices 260 may be equipped with a broadband connection that allows the drone devices 260 to connect with the network 205.

In some implementations, the drone devices 260 may include data capture and recording devices. In some instance, the drone devices 260 may include one or more cameras, one or more motion sensors, one or more microphones, one or more biometric collection tools, one or more temperature sensors, one or more humidity sensors, one or more airflow sensors, and/or other types of sensors that may be useful in capturing monitoring data related to user safety. For example, once dispatched to a location where the user may require emergency assistance, the drone devices 260 may capture a video feed of the user showing the extent of injury and transmit the video feed to either the application server 270 or directly to an emergency responder to alert them about the user's condition. In other examples, the drone devices 260 may be outfitted with thermal-imaging cameras capable of identifying locations, people, or pets through structural features of a location. For example, the drone devices 260 may be deployed to a property in which a user is located and may use the thermal-imaging cameras to determine a particular location within the property where the user may be trapped inside the property. In such examples, the drone devices 260 may transmit the captured thermal video footage to an emergency responder, such as a nearby fire station.

In some implementations, the drone devices 260 may also include output devices. In such implementations, the drone devices 260 may include one or more displays, one or more speakers, one or more projectors, and/or any type of output devices that allow the drone devices 260 to communicate information to nearby emergency contacts. For example, if a user is physically disabled as the result of an incident and unable to use wearable devices 240 or mobile devices, the user may record a distress message or video using the drone devices 260, which may then transmit the message or video to the application server 270.

In some implementations, the drone devices 260 may be configured to record visual verifications and/or identify perpetrator identification for particular types of incidents. For example, in response to safety incidents determined by the application server 270, the application server 270 may deploy the drone devices 260 to record video footage. In some instances, the drone devices 260 may be configured to operate within certain geographic regions (e.g., a gated residential community). The drone devices 260 may be centrally operated by a security provider such as an alarm security company providing security services to a particular geographic region. In such instances, the drone devices 260 may be stored in a central home base with a charging and control station and deployed as a mobile solution in response to an incident signals for users.

In some implementations, the drone devices 260 may be delivery drones (e.g., a parcelcopter) that may be utilized by the monitoring platform 200 to provide supplies or other equipment to a user in response to the application server 270 detecting the occurrence of an incident. For instance, the drone devices 260 that are delivery drones may be used to dispatch first aid kits and/or other emergency medical equipment (e.g., gauze, bandages, braces, epi pens, tourniquets, etc.). In such instances, the drone devices 260 may deliver particular supplies based on the classification of the incident by the application server 270.

In some implementations, after the application server 270 determines an incident, the application server 270 may select the particular drone device 260 to deploy to the incident from a set of drone devices 260 based on particular attributes such as, for e.g., charge levels, location of the incident, and the direction of user movement. For example, the set of drone devices 260 may include various drone devices 260 with varying battery capacities, aerial speeds, and/or device features. In such examples, the monitoring platform 200 may choose the particular drone device 260 to be deployed that can get to the location of the incident the fastest and has enough battery to monitor the user for a reasonable amount of time (e.g., fifteen minutes).

In some implementations, multiple drone devices from the set of drone devices 260 may be deployed based on the particular nature of the safety incident. For example, the application server 270 may deploy multiple drone devices if the received user data indicates the safety incident is a life-critical incident (e.g., a house fire) that causes a loss of life. In some instances, the multiple drone devices may be deployed sequentially to maximize response time and conserve resources. For example, the multiple drones may include a diagnostic drone device, which is deployed initially to minimize response time, and a support drone device that provide the user with emergency supplies to help with the emergency event. In another example, an initial drone device may be deployed to minimize response time while a secondary drone is deployed as a backup if the battery of the initial drone runs out.

The application server 270 may be an electronic device configured to process data from the monitoring control unit 210. In some examples, the application server 270 is similar to the property management server 130 as described with respect to FIG. 1. For example, the application server 270 may determine from received sensor data whether the user is injured or in danger. To make the determination, the application server 270 may provide control services by exchanging electronic communications with the monitoring control unit 210 and the mobile devices 230 over the network 205. For example, the application server 270 may be configured to monitor user data generated by the devices connected to the monitoring platform 200 such as the sensors 222, the devices 230, 280, the wearable devices 240, the one or more wireless sensor beacons 250, and the drone devices 260. In this example, the application server 270 may exchange electronic communications over the network 205 to send and/or receive information regarding user activity such as biometric data, activity data, location data and health data. The application server 270 also may receive information regarding activity within or external to the property from the devices 230, 280 or the wearable devices 240.

In some implementations, the application server 270 may store a user profile with user data transmitted from the devices connected to the monitoring platform 200.

In some instances, the application server 270 may be configured to determine particular duress codes sent by the user in the event of an emergency incident. For instance, the user may enter a pre-determined or customized duress code it appears as if the user has cancelled the alarm but actually transmits a duress signal to the application server 270. For example, the user may enter the duress code during a robbery.

Figure 3:
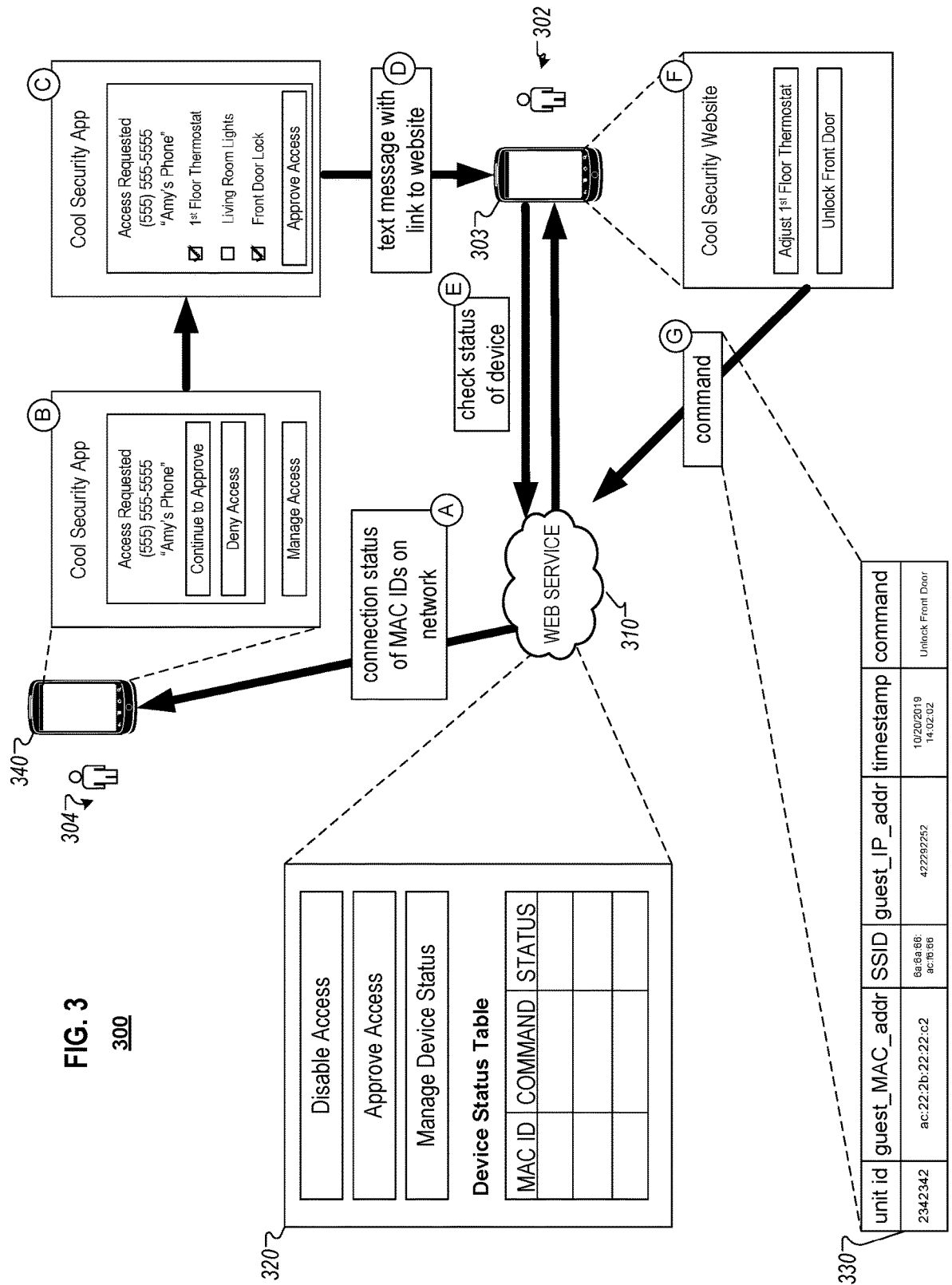
FIG. 3 illustrates a data flow for a process that allows control of a monitoring system based on commands provided by a user granted temporary access to the monitoring system.

FIG. 3 illustrates a data flow for a process 300 that allows control of a monitoring system based on commands provided by a user granted temporary access to the monitoring system. Process 300 can be performed, for example, by systems 100, 200 as described above with respect to FIGS. 1-2. The process 300 is convenient for the guest and secure for the owner, removing the need for owners to grant full access to the monitoring control system while still allowing guests to control specific devices.

Guest user 302 uses a mobile device 303. In some implementations, guest user 302 corresponds to user 102 and mobile device 303 corresponds to mobile device 103 of FIG. 1. Authorized user 304 uses a mobile device 340. In some implementations, authorized user 304 corresponds to authorized user 104 and mobile device 340 corresponds to mobile device 104 of FIG. 1. Authorized user 304 can, for example, be an administrator and/or primary account holder with respect to a monitoring control unit.

Web service 310 represents a network-based solution that allows a user to control a monitoring system and systems in communication with a monitoring system at a property. For example, web service 310 can be an embodiment of monitoring control unit 110, 210 of FIGS. 1-2 at a property 101. Web service 310 is accessible through a network, such as network 105, 205 of FIGS. 1-2.

When an administrator and/or primary account holder for a monitoring control unit that operates over a web service 310 logs into a native control application, the administrator has access to a page that displays a list of devices currently connected to the network at the property. For example, a homeowner 304 can access a control application, such as control application 232, through a mobile device 340 to view a page displaying a list of devices currently connected to the network at the property. The control application can, for example, be a native control application that is downloaded from a particular application store. In some implementations, the control application can be accessed through a webpage interface that communicates with web service 310, accessible through a browser application on the administrator's mobile device. If the administrator is logged into the native control application, the administrator can receive notifications when a new user is connected to the network associated with the administrator's account. In some implementations, the administrator does not need to be logged into the native control application, and can receive a notification that directs them to the native control application. The administrator can select one or more guest devices for which to approve or deny access from the list of devices connected to the network. If the administrator approves the request, they will be given the option to choose the devices within the property and connected to the monitoring control unit that the guest device can access. In some implementations, if the guest is an approved user, the administrator can select the guest's contact information from their phone address book so that information about logging into the system can be delivered to the guest via text. In some implementations, the administrator can enter the guest's phone number directly. Once the request has been approved by the administrator, a link can be generated to direct the guest to a website interface for the web service 310.

Web service 310 maintains information regarding devices, commands, and networks. Example information is shown, in this example, within interface 320. Interface 320 shows, for example, actions that allow a user to disable a device's access to a monitoring control unit, actions that allow a user to approve a device's access to a monitoring control unit, and actions that allow a user to manage devices and their status with respect to access to the monitoring control unit.

In step A of process 300, the web service 310 monitors the connection status of MAC IDs on the network and provides updates to mobile device 340 of authorized user 304. For example, web service 310 can continuously monitor new connections and disconnections to provide connection statuses of MAC IDs on network.

In step B of process 300, the web service 310 provides a notification to mobile device 340 of authorized user 304 requesting access. For example, web service 310 can provide a notification to mobile device 340 through a monitoring control application on mobile device 340. As shown in FIG. 3, the notification can include information regarding the device requesting access to web service 310. The notification displays information determined from, for example, MAC information provided by the device 303. The MAC information can be transmitted along with other information such that the MAC information serves as an identifier with which information is associated and stored by web service 320. This information includes, for example, the phone number of mobile device 303, the name of the device (e.g., "Amy's Phone"), the type of device (e.g., a cellphone, laptop, tablet, etc.), the operating system running on the device (e.g., Linux, Windows, Android, iOS, etc.).

In some implementations, the notification is generated as a notification within a native control application that communicates with web service 310. For example, the notification can be presented as a pop-up notification within a native control application installed on the administrator 304's mobile device 340. In some implementations, the notification can be presented as a text message that provides a link to a webpage interface for web service 310. For example, the notification can be a text message sent to administrator 304's mobile device 340 that provides a link to a webpage interface for web service 310. By providing a link to a webpage interface, this technique allows an administrator 304 to access the web service without needing to download and/or install a separate application.

In some implementations, the notification is generated in response to a request from the guest 302. In some implementations, the notification is generated in response to detecting that mobile device 303 is newly connected to the network within the property (not shown).

The notification offers options to continue to approve the request to grant guest 302 access to web service 310, to deny the request to grant guest 302 access to web service 310, or to manage access overall to web service 310. The "Manage Access" option allows administrator 304 to manage access to web service 310 in more detailed ways, including setting up a contact profile with a phone number provided through the MAC information. In some implementations, the MAC address can provide information such as the phone number of the cellphone 303. In some implementations, the MAC address can be associated with a phone number that was previously provided along with the MAC address and stored by the web service 310. In some implementations, administrator 304 can create profiles for different levels of access that can be granted to a guest.

In process 300, the system can assume that a guest 302 may be a trusted user, because the user has access to the network. For example, a guest 302 can be a trusted user because guest 302 has the password to the network and is already connected to the network of the property.

Administrator 304 can, in this example, choose to "Continue to Approve" the request to grant guest 302 access to web service 310, proceeding to step C.

In step C of process 300, mobile device 340 displays a different user interface screen that allows administrator 304 to select particular devices connected to a monitoring control unit within a particular property to which guest 302 should be granted access to control.

In this example, administrator 304 can choose to grant guest 302 access to control devices such as the "1st Floor Thermostat," "Living Room Lights," and "Front Door Lock," among other devices and systems. Administrator 304 can grant guest 302 access to control any of the devices and systems described above with respect to FIGS. 1-2 that are communicably connected to the monitoring control unit.

The user interfaces shown in steps B and C are only example interfaces. Other user interfaces and input methods are contemplated. For example, administrator 304 can select a device or system from a drop-down menu, use radio buttons, a text box, etc.

In some implementations, steps B and C are performed within a webpage interface for web service 310 and through a browser application installed on administrator 304's mobile device 340. In other implementations, steps B and C can be performed within a native control application installed on administrator 304's mobile device 340. In some implementations, steps B and C can be performed within different interfaces. For example, step B can be performed within a native control application interface and step C can be performed on a larger, more detailed webpage interface, or vice versa.

Administrator 304 can then select "Approve Access" to grant the guest 302 with access to web service 310 to control the selected devices and systems and proceed to step D. Restrictions on the access granted to guest 302 can additionally include a time limit or a number of commands provided, among other restrictions. For example, administrator 304 can limit the amount of time for which guest 302 is granted access to control various devices through web service 310.

In step D of process 300, web service 310 provides guest 302 with a link that grants guest 302 access to the web service 310 and control over particular devices and systems that are controlled by and through web service 310. For example, web service 310 can text a link to a webpage interface for web service 310 to mobile device 303. A temporary seamless login token can be generated in response to receiving approval from administrator 304. This token can be provided to the guest, for example, such that the guest is able to access the web service directly. For example, the token can be appended to a website URL provided to the guest through a text message, such as https://coolsecuritywebsite.com/web/guest.aspx?token=ABCDEF1234AABBCCDD2, where ABCDEF1234AABBCCDD2 is the seamless login token. The website URL can, for example, direct the guest to a website interface for a web service 310.

By transmitting a link to a webpage instead of directing the guest 302 to download an application, the process 300 provides a seamless method for allowing guests access to control various devices that avoids requiring that the guest install an application on their device and avoids needing a user account with associated user name and password logins be created for the guest.

In addition to generating and transmitting the temporary seamless login token, the web service 310 can update its database to reflect the status of the device as "Approved," recording device information such as the MAC ID of the device and any subsequent commands received from that device. The web service 310 can update its database to reflect GPS coordinates of the device so that the location of the device can be determined. In some implementations, and the web service 310 can determine whether the device is within a predetermined distance, or range, of the property. For example, the web service 310 can verify whether the guest's location coordinates are within a certain radius of the property's location to ensure that the guest is at or within the property. The web server 310 stores the coordinates of the property and/or the monitoring control unit such that the guest's device coordinates can be compared to the coordinates of the property.

In step E of process 300, web service 310 can receive input from guest 302 through mobile device 303. For example, web service 310 can receive a request to access the website URL with the seamless login token from guest 302 through mobile device 303. In response to receiving the input, web service 310 can verify the status of device 303 to ensure that device 303 is "Approved" before providing a webpage interface to web service 310 to mobile device 303. Web service 310 can verify the status of device 303, for example, by verifying that the device 303 has been approved to access the website URL. Web service 310 can, for example, determine whether the device 303 is associated with a status of "Approved" within the database 320 of web service 310.

In some implementations, the administrator 304 creates a secondary profile that expires after a predetermined period of time. For example, the administrator 304, who holds a primary profile with web service 310 to control the monitoring control unit within the property and associated devices and systems, can create a secondary profile with web service 310 that has fewer privileges, lesser access, and/or lesser control over various systems/devices. This secondary profile, which is not an administrator profile, allows a user other than the administrator to access web service 310. In some implementations, the web service 310 provides an approved guest 302 with access to the web service 310 through the administrator 304's account.

In step F of process 300, web service 310 has verified the status of mobile device 303 and provides mobile device 303 with the webpage interface for the web service 310. The webpage interface, in this example, provides guest 302 with options to provide commands to devices of a monitoring control system on a property that were selected by administrator 304 in step C. For example, the webpage interface provides guest 302 with options to provide commands to "Adjust 1st Floor Thermostat" and "Unlock Front Door." These options can change based on the status of the devices in addition to input from administrator 304 or automatic changes implemented by web service 310. For example, if the front door is unlocked, then the option can change to "Lock Front Door."

In some implementations, when guest 302 receives the text message and taps on the link, their phone's browser will open, and they will be directed to the webpage interface and automatically logged in using the seamless login token. The token can be valid for a user-configured amount of time determined by the administrator. In some implementations, the token can be valid for a default amount of time. Once guest 302 is logged in, they will only be able to control and access features to which they were granted access.

Every request made by the guest to change the state of a device (e.g., a command) will require a check to ensure that the seamless login token has not expired and is still valid. The administrator can revoke the guest 302's access at any time.

If, at any point, guest 302 is no longer connected to the Wi-Fi network associated with the administrator's account, guest 302 will not be able to access or control features or devices of the monitoring control unit and the token will expire. For example, a network module of the monitoring control unit within the property can continuously scan network 105 for new connections from mobile devices. For example, a background process can be running on the network module to listen for new network connections. When a new connection is detected, the service can provide a notification to a device of an authorized user to alert the user that a guest device has connected to the network 105. The process can periodically scan for new connections. For example, the process can scan for new connections every 5 seconds. In some implementations, the process can listen for a connection or disconnection event. For example, the process can listen for the occurrence of a connection or disconnection event and detect when such an event has occurred. In some examples, the process can specifically verify that a connection or disconnection event is associated with an IP address inside of the property. In order to regain access, the guest 302 can send a request to the administrator. For example, web service 310 can transmit a notification to the guest 302, asking if they would like to request renewed access. The guest 302 can select that they would like to request renewed access, and the web service 310 can provide a notification to administrator 304. If approved, another temporary seamless login token can be generated and sent via text message to the guest 302. In some implementations, the web service 310 can automatically detect that a guest 302's access is expiring and transmit a notification to administrator 304 that a guest 302's access is expiring and ask if administrator 304 would like to renew guest 302's access without requiring the guest 302 to perform any further actions.

In some implementations, web service 310 allows administrator 304 to grant a guest 302 with access only if administrator 304's mobile device 340 was connected to the same network at the time the guest's phone was detected as a new connection to the network. For example, web service 310 may not provide administrator 304 with a notification through the administrator's mobile device 340. In some implementations, web service 310 may alert administrator with a notification through administrator's mobile device 340 that a new connection has been detected, but provides the administrator with the option of reporting the connection or forcing a disconnection instead of granting access to the newly connected device. In some implementations, web service 310 may still provide administrator 304 with the ability to approve access for the newly connected device. In some implementations, administrator 304 can change this setting.

In some implementations, guests will not be able to approve or reject requests from other guests. For example, because guests are not provided with credentials for web service 310, and are only provided with a temporary authentication token, the guests cannot approve or deny requests from other guests. In some implementations, guests can provide lesser levels of control than they possess to other guests. For example, parents can provide children with limited access to devices when visiting administrator 304's house.

In some implementations, restrictions can be put into place regarding the times at which the system automatically scans for new devices. For example, the administrator 304 can designate certain times for a network module of the monitoring control unit to automatically scan for new devices and send requests to the host only during the daytime. The administrator 304 can turn off the automatic scanning if, for example, they don't want to receive automatic notifications for access. Turning off the automatic scanning can also prevent requests from being sent out to the administrator 304 automatically when guests don't need access, saving resources and reducing electronic clutter for the administrator 304. In some implementations, the administrator 304 can choose to initiate the process of granting the guest 302 access to web service 310 without waiting for the guest 302 to request access.

In step G of process 300, the webpage interface can receive input from guest 302 through mobile device 303 and provide the input from the guest 302 to the web service 310. For example, guest 302 can select a command to "Adjust 1st Floor Thermostat." In some implementations, selecting this command brings up a separate interface where the guest 302 can select a temperature for the thermostat and submit the temperature as a command 330. In this example, guest 302 has selected a command to "Unlock Front Door."

Command 330 includes information including, for example, a unit ID for the device for which the command 330 is meant. Command 330 includes a guest_MAC_addr field that indicates the MAC address for the device 303 that provided the command 330 and the SSID of the device 303. Command 330 includes a guest_IP_addr field that indicates the IP address for the device 303 that provided the command 330 and the timestamp of when the command 330 was generated. Command 330 also includes the command itself.

The information included in command 330 can be determined, from, for example, data provided to web service 310 or the network module of the monitoring control unit, including the MAC address and device name. This information can be stored by web service 310 and associated with administrator 304's account. The information assists the administrator 304 with easily identifying the owner of the device and selecting the particular device and guest to whom access is granted. For example, the name of the phone 303, "Amy's Phone," would allow administrator 304 to easily identify which device belongs to guest 302 Amy.

In one example, a guest 302 visits the home of authorized user 304 and is connected to the Wi-Fi network in the home. The guest 302 then wants to turn on the living room lights but doesn't know where the switch is. The guest 302 can download and open a control application for the monitoring control unit in the home and request access to the system. The guest 302 can also access a webpage interface that controls the monitoring control unit instead of downloading and installing a separate application. In this example, authorized user 304 did not turn on the lights, so when the request comes in, authorized user 304 can simply approve the request and grant the guest 302 access to lights in the home so that the guest 302 can then turn the lights on and off as needed without asking the homeowner to do so.

In another example, a guest 302 visits the authorized user 304's home. Authorized user 304 steps out after a while to pick up food. The guest 302 is cold but doesn't know how to manually configure the thermostat or doesn't want to go downstairs to change it. The guest 302 requests access to the authorized user 304's devices which includes the thermostat. The authorized user 304 can then approve the request and the guest 302 can control the thermostat using the webpage interface or application where the user interface is more intuitive.

In another example, the guest 302 is limited to an access session that is valid for 1 hour. After an hour, when the guest 302 tries to change the set point of the thermostat, they get an error saying their session has ended and that they can no longer access the device. In some implementations, the guest 302 can remain in the home, but can't change the setpoint for the thermostat. For example, the guest 302 can be a hotel or lodging guest and access to certain devices can be limited when the guest 302's stay at the hotel has ended, such that the guest 302 must pay to continue controlling the device.

In some implementations, administrator 304 can provide different levels of access to different users, providing preset profiles or scenes. For example, administrator 304 can revoke access to video game consoles or TVs after 1 hour for children when they return home from school.

In one example, a guest who has never been at a home enters it for the first time and would like to turn the living room lights on. In some implementations, the guest 302 sees a link to the public page on the fridge, and then they will open their phone's browser and navigate to the page, their device SSID and MAC are sent to the backend, and administrator 303 is notified so that they can approve the access. Once approved, the guest 302 receives a text message with a link to the webpage interface for the web service along with an encrypted token in the URL. The page can then show the devices to which the guest 302 has access and the guest 302 can tap on the lights to turn them on. In another implementation, the guest 302 can enter the home and connect to the Wi-Fi. The network scanner will detect the new device and send a notification to the administrator 304 for approval, making the process automatic and seamless.

In another example, a guest 302 who is outside the home and connected to the Wi-Fi can be granted access to unlock the front door. However, a guest 302 outside the home but not connected to the Wi-Fi network, can be determined to not be connected to the network, and therefore the web service 310 may not grant access to the guest 302's device. Additionally, when a guest 302 leaves and disconnects from the Wi-Fi network, the web service 310 will not grant access.

In another example, when the Wi-Fi password for a network is changed, all guest devices can be disconnected and their access to the system revoked. When a guest 302's access is revoked through the application by authorized device 340, the guest's access is revoked entirely.

In another example, the administrator 304 can revoke access to some devices but not all. In some implementations, when a guest 302's session expires and they would like more time, the guest 302 can transmit a notification or request to authorized user 304 to extend their access.

In some implementations, the administrator 304 can block devices entirely based on their device's MAC address. The administrator 304 can manually enter the address or select, for example, from among a list of recently connected devices.

In some implementations, when more than one guest is at a home, an administrator 304 can grant separate access to each of the guests with different levels of access. When a guest 302 stays for an extended period of time, administrator 304 can provide a longer period of access.

In another example, an administrator 304 can own a rental property or a home for sale, and grant a real estate agent temporary access to the property to show the property or to tour the property. In situations such as a tour or other such "scenes," the administrator 304 can set all of the lights to turn on.

In some implementations, the administrator 304 can grant access to monitoring systems such as video feeds to guests, such as parents, who wish to watch the feeds at a daycare facility.

Figure 4:
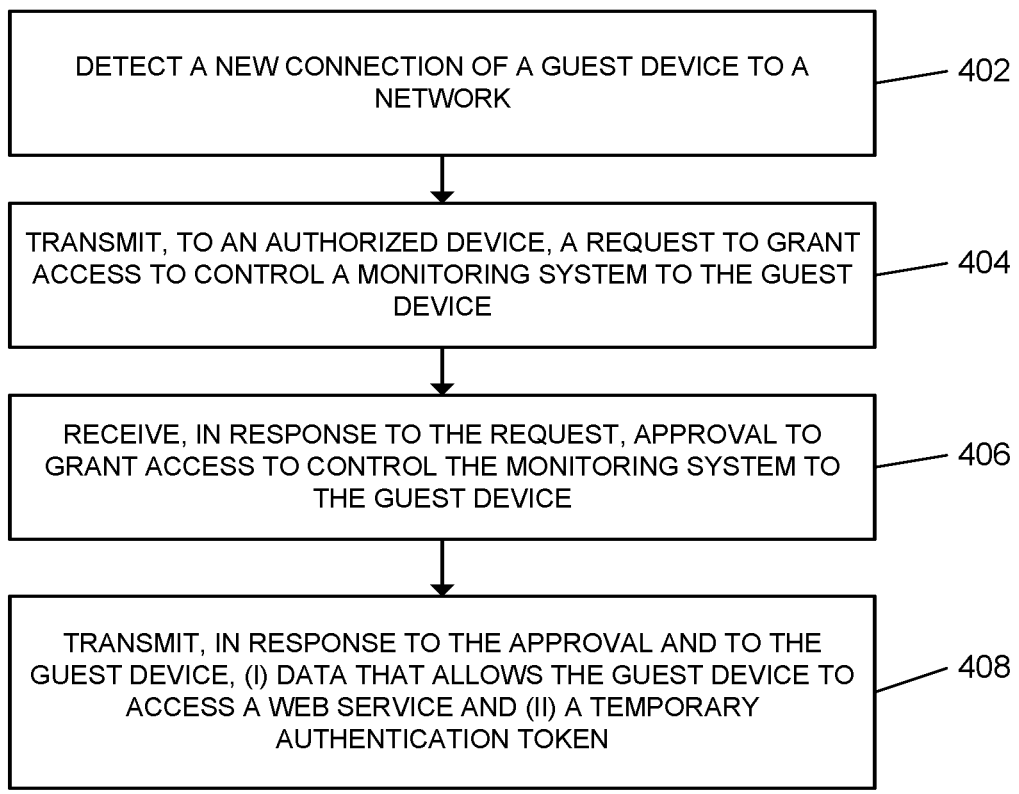
FIG. 4 is a flow chart of an example process of controlling a monitoring system based on commands provided by a user granted temporary access to the monitoring system.

FIG. 4 is a flow chart of an example process of controlling a monitoring system based on commands provided by a user granted temporary access to the monitoring system. In some implementations, process 400 can be performed by one or more systems. For example, process 400 can be implemented by mobile devices 103, 140 (or 303, 340) and monitoring control unit 110 (web service 310), of FIGS. 1-3. In some implementations, the process 400 can be implemented as instructions stored on a non-transitory computer readable medium, and when the instructions are executed by one or more servers, the instructions can cause the one or more servers to perform operations of the process 400.

Process 400 begins with detecting a new connection of a guest device to a network (402). For example, a network module of monitoring control unit 110 can monitor the network of a property as described with respect to FIGS. 1-3. The network module of monitoring control unit 110 can detect a new connection from a guest device to the Wi-Fi network of a property and transmit this data to a web service 310. As described above with respect to FIGS. 1-3, a new connection can be any connection. In some implementations, even if a guest device has previously connected to a network, if the guest device is disconnected and then reconnected, the monitoring control unit can consider the re-connection as a new connection. For example, if a maintenance worker connects to the network on Monday and is granted access to control the front door to access supplies and tools but must return on Tuesday to complete the work, when the maintenance worker connects to the network on Tuesday, this would be considered a new connection. In some implementations, the monitoring control unit can provide a grace period between connections. For example, if the network goes down or if a guest device temporarily goes out of range of the network, the monitoring device can allow a reconnection by the same guest device to the network to use the same temporary authentication token and retain authorization to access the monitoring system.

Process 400 continues with transmitting, to an authorized device, a request to grant access to control a monitoring system to the guest device (404). For example, web service 310 can transmit a notification to authorized device 140 to grant access to control the monitoring system of the property through the web service 310 itself. Transmitting the request to authorized device 140 can be performed automatically in response to detecting the new connection, and does not require the guest to perform any additional actions or generate a request.

The request to grant access can be a notification that allows a user of the authorized device to provide input indicating whether the request is approved. For example, the monitoring control unit can transmit a notification that pops up on the authorized device, such as a text message or banner notification or other type of notification, and the notification can allow the user of the authorized device to provide input. For example, the notification can include user interface elements, such as buttons, checkboxes, radio buttons, text fields, and other elements, that allow a user to provide input indicating whether the request is approved, in addition to other information, such as the type of access that the guest device is to be provided, the length of time for which the access is to be provided, among other information.

The request to grant access can include information that allows the user of the authorized device to make an informed decision. For example, the request to grant access can include information such as the guest device name, the guest device identifier, and monitoring system information associated with the guest device, among other information. In one example, the request to grant access can include monitoring system sensor data, such as an image or video of the user of the guest device, audio recording of the user of the guest device identifying themselves, or a connection time or type of connection of the guest device to the network (such as through a password or through a physical connection), among other data, or calculated data, including a map of the guest device's location, etc. The connection method of the guest device to the network can provide information useful for determining the level of access to provide to the guest device. For example, if a guest device connects to the network using a password provided only to authorized users, the guest device may be granted more access than a guest device that connects to the network using a password provided to one-time or occasional guests, such as technicians.

Process 400 continues with receiving, in response to the request, approval to grant access to control the monitoring system to the guest device (406). For example, web service 310 can receive approval from authorized device 140 to grant access to control the monitoring system to guest device 103.

In some implementations, receiving, in response to the request, approval to grant access to control the monitoring system to the guest device includes generating, by the monitoring control unit and based on guest device information, automatic approval of the request. For example, the monitoring control unit can determine, based on the device identifier, whether the guest device has previously been granted approval to control the monitoring system or has previously been connected to the network. In some implementations, the monitoring control unit and/or monitoring system can automatically deny the request based on guest device information. For example, the monitoring control unit can determine, based on the device identifier, that the device has previously been denied access. In another example, the monitoring control unit and/or monitoring system can automatically deny, based on the device type, access to the guest device.

Guest device information can include one or more of a network connectivity status, a prior authorization status, or a device identifier, among other parameters. Guest device information provides the monitoring control unit and/or monitoring system with information regarding the guest device that allows the monitoring control unit and/or monitoring system to evaluate the guest device and provide device information to the authorized device such that the authorized device is able to make an informed decision.

Process 400 continues with transmitting, in response to the approval and to the guest device, (i) data that allows the guest device to access the web service and (ii) a temporary authentication token. The data that allows the guest device to access the web service includes a link to a secure website that provides access to devices connected to the monitoring system. For example, web service 310 can transmit a URL to a webpage interface and a temporary authentication token to the mobile device 103 in response to receiving approval from authorized device 140. The webpage interface can be a secure website that provides functionality for controlling various devices and settings of devices connected to the monitoring system.

The webpage interface provides functionality for controlling devices and settings of devices connected to the monitoring system by receiving, from the guest device, a command for a particular device connected to the monitoring system and transmitting a particular command to the monitoring system. For example, a user of the guest device can input a "Temperature Down" command for an HVAC system connected to the monitoring system to the webpage interface. The webpage interface can then transmit the "Temperature Down" command to the monitoring system, which can control the HVAC system. This process allows an authenticated guest device to control certain devices and settings associated with a particular monitoring system without permanently having access to the devices or being authorized. Additionally, the data that allows the guest device to access a web service allows the guest device to access a device connected to the monitoring system without requiring installation of a device-specific application. The described method allows an authenticated guest device to perform actions such as controlling certain devices and settings associated with a particular monitoring system without being required to download an application specific to the devices and/or monitoring system.

The method can include, for example, providing, by the guest device and to the secure website, (i) the temporary authentication token and (ii) a command for a device connected to the monitoring system, where the temporary authentication token is used to authenticate the guest device to the secure website prior to communication with the monitoring system.

The temporary authentication token authenticates the guest device as a device that can be used to access devices and/or settings associated with the monitoring system. For example, the temporary authentication token can indicate that the guest device is a device approved by an authorized device, such as the device of an owner of a particular property, to access devices and/or settings associated with the monitoring system of the particular property.

The temporary authentication token indicates one or more parameters including an expiration time for the token, a level of access to be provided, or guest device information. For example, the temporary authentication token can indicate that it should expire in 1 day. In some implementations, the temporary authentication token expires when the guest device is disconnected from the network. For example, if the guest device belongs to a friend of the host of a housewarming party at a particular apartment, the temporary authentication token can expire when the friend and the guest device leave the apartment and are disconnected from the network.

The temporary authentication token can indicate parameters including the level of access that the guest device is authorized to have. For example, the guest device can be authorized to access only devices such as the front door, the HVAC, and the sound system, but not devices such as an electronic safe, the entire lock system for a property, security cameras and sensors, among other monitoring system devices.

The temporary authentication token can indicate parameters including guest device information, such as the device identifier of the guest device and the type of guest device, among other parameters. For example, the temporary authentication token can indicate parameters including the guest device identifier, which can be used by the monitoring control unit to determine whether the guest device has been connected to the network before, and/or whether the guest device has previously been authorized. Additionally, the monitoring control unit can use the guest device information can be used to determine other parameters, including an expiration time for the token and/or the level of authorization to be provided to the guest device, among other parameters.

The secure website can display a set of commands available for devices connected to the monitoring system. For example, the secure website can display to the guest device only the set of commands that are available to the guest device based on the temporary authentication token and parameters including the level of authorization that the guest device should be granted.

In some implementations, the temporary authentication token can be included by the monitoring control unit with the data that allows the guest device to access the web service. For example, the temporary authentication token can be appended to the URL of the secure website provided to the temporary authentication token. In a specific example, the token can be appended to a website URL provided to the guest through a text message, such as https://coolsecurity-website.com/web/guest.aspx?token=ABCDEF1234AABBCCDD2, where ABCDEF1234AABBCCDD2 is the temporary authentication token. In some examples, the temporary authentication token can be included as a payload along with the URL to be forwarded to the web service by the guest device. In another example, the temporary authentication token can be automatically fetched from the guest device based on instructions provided with the data that allows the guest device to access the web service, and does not require additional action by the guest device.

Once the guest device 103 has access to the web service, the guest device 103 can provide commands to, change settings of, and update devices controlled by the web service 310. In some implementations, the approval to grant access to the guest device to control the monitoring system includes one or more access parameters, including an indication of a set of devices connected to the monitoring system that the guest device can access, a period of authorization, a range of values for a particular command, or a set of restrictions. For example, the authorized device can provide, along with, or as part of the approval to grant access, access parameters including an indication, such as a list, of a set of devices to which the guest device has access. Additionally, the authorized device can provide a period of authorization for each device in the list of devices to which the guest device has access. For example, the authorized device can specify that the guest device, associated with an HVAC technician, may access the front door lock only once, but the guest can adjust the HVAC system over the course of 4 hours while the technician is working on the system.

The guest device's access to the monitoring system and any associated devices and settings can be changed at any time by authorized devices or by the monitoring system or monitoring control unit. For example, the method can further include receiving, by the monitoring control unit and from the authorized device, data indicating a change to one or more access parameters for the guest device and updating, by the secure website and based on the data indicating the change, the one or more access parameters for the guest device.

In addition to updates to the access parameters, the temporary authentication token can automatically expire, indicating that the guest device is no longer authorized to access the monitoring system, or automatically renew, extending the guest device's authorization to access the monitoring system. For example, the temporary authentication token can indicate an expiration time for the token, and the temporary authentication token can be automatically renewed. The monitoring control unit and/or monitoring system can renew the temporary authentication token prior to the token's expiration to provide the user of the guest device with a seamless experience. For example, the monitoring control unit can determine that the temporary authentication token is expired and automatically generate a renewed, or a new temporary authentication token. The monitoring control unit can generate a new temporary authentication token, and the guest device can provide the new temporary authentication token to the secure web site.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for granting guest access to a control devices, comprising:

maintaining, by a monitoring control unit, a web service that provides access to control one or more devices connected to a monitoring system of a property;

scanning, by the monitoring control unit, a network within the property for new connections;

detecting, by the monitoring control unit, a new connection of a guest device to the network within the property;

in response to detecting the new connection of the guest device to the network within the property, transmitting, by the monitoring control unit and to an authorized device, a request to grant access to the guest device to control at least one of the one or more devices connected to the monitoring system of the property;

receiving, by the monitoring control unit, an approval to grant access to the guest device to control at least one of the one or more devices connected to the monitoring system of the property;

in response to receiving the approval, transmitting, by the monitoring control unit and to the guest device, (i) data that enables the guest device to access the web service that provides access to control at least one of the one or more devices connected to the monitoring system of the property, and (ii) a temporary authentication token that is used to authenticate the guest device to control at least one of the one or more devices connected to the monitoring system of the property;

detecting, by the monitoring control unit, that the guest device is disconnected from the network within the property; and in response to detecting, by the monitoring control unit, that the guest device is disconnected from the network within the property, setting the temporary authentication token to have an expired status.

2. The method of claim 1, wherein the data that enables the guest device to access the web service includes a link to a secure website that provides access to at least one of the one or more devices connected to the monitoring system.

3. The method of claim 2, wherein the secure website enables the guest device to control at least one of the one or more devices connected to the monitoring system by:

receiving, from the guest device, a command for a particular device connected to the monitoring system; and transmitting a particular command to the monitoring system.

4. The method of claim 1, wherein the temporary authentication token indicates one or more parameters including an expiration time for the temporary authentication token, a level of access to be provided, or guest device information.

5. The method of claim 2, further comprising:

providing, by the guest device and to the secure web site, (i) the temporary authentication token and (ii) a command for a device connected to the monitoring system, wherein the temporary authentication token is used to authenticate the guest device to the secure website prior to communication with the monitoring system.

6. The method of claim 5, wherein the secure web site displays a set of commands available for at least one of the one or more devices connected to the monitoring system.

7. The method of claim 1, wherein the data that enables the guest device to access the web service enables the guest device to access at least one of the one or more devices connected to the monitoring system without requiring installation of a device-specific application.

8. The method of claim 1, wherein the approval to grant access to the guest device to control at least one of the one or more devices connected to the monitoring system includes one or more access parameters, including an indication of a set of devices connected to the monitoring system that the guest device is granted access to, a period of authorization, a range of values for a particular command, or a set of restrictions.

9. The method of claim 1, wherein the network within the property is a Wi-Fi network associated with the property.

10. The method of claim 1, further comprising:

receiving, by the monitoring control unit and from the authorized device, data indicating a change to one or more access parameters for the guest device; and updating, by the web service and based on the data indicating the change, the one or more access parameters for the guest device.

11. The method of claim 1, wherein the request to grant access is a notification that causes presentation of a user interface element that enables input, at the authorized device, of an indication whether the request is approved.

12. The method of claim 1, wherein receiving, by the monitoring control unit, the approval to grant access comprises:

generating, by the monitoring control unit and based on guest device information, automatic approval of the request.

13. The method of claim 12, wherein the guest device information comprises one or more of a network connectivity status, a prior authorization status, or a device identifier.

14. The method of claim 1, further comprising:

determining, by the web service, that the temporary authentication token is expired; and in response to determining that the temporary authentication token is expired, renewing, by the monitoring control unit and based on guest device information, the temporary authentication token.

15. The method of claim 1, wherein the data that enables the guest device to access the web service includes a link to the web service, and the temporary authentication token is appended to the link to the web service.

16. A system comprising:

a monitoring system associated with one or more properties and a network within the one or more properties; and a monitoring control unit that performs operations comprising:

maintaining a web service that provides access to control one or more devices connected to the monitoring system associated with the one or more properties;

scanning the network within the one or more properties for new connections;

detecting a new connection of a guest device to the network within the one or more properties;

in response to detecting the new connection of the guest device to the network within the one or more properties, transmitting, to an authorized device, a request to grant access to the guest device to control at least one of the one or more devices connected to the monitoring system associated with the one or more properties;

receiving an approval to grant access to the guest device to control at least one of the one or more devices connected to the monitoring system associated with the one or more properties;

in response to receiving the approval, transmitting, to the guest device, (i) data that enables the guest device to access the web service that provides access to control at least one of the one or more devices connected to the monitoring system associated with the one or more properties, and (ii) a temporary authentication token that is used to authenticate the guest device to control at least one of the one or more devices connected to the monitoring system associated with the one or more properties;

detecting that the guest device is disconnected from the network within the one or more properties; and in response to detecting that the guest device is disconnected from the network within the one or more properties, setting the temporary authentication token to have an expired status.

17. The system of claim 16, wherein the data that enables the guest device to access the web service includes a link to a secure website that provides access to at least one of the one or more devices connected to the monitoring system.

18. The system of claim 17, wherein the secure website enables the guest device to control at least one of the one or more devices connected to the monitoring system by:

receiving, from the guest device, a command for a particular device connected to the monitoring system; and transmitting a particular command to the monitoring system.

19. A non-transitory computer storage medium encoded with instructions that when executed by one or more processors cause the one or more processors to perform operations comprising:

maintaining, by a monitoring control unit, a web service that provides access to control one or more devices connected to a monitoring system of a property;

scanning, by the monitoring control unit, a network within the property for new connections;

detecting, by the monitoring control unit, a new connection of a guest device to the network within the property;

in response to detecting the new connection of the guest device to the network within the property, transmitting, by the monitoring control unit and to an authorized device, a request to grant access to the guest device to control at least one of the one or more devices connected to the monitoring system of the property;

receiving, by the monitoring control unit, an approval to grant access to the guest device to control at least one of the one or more devices connected to the monitoring system of the property;

in response to receiving the approval, transmitting, by the monitoring control unit and to the guest device, (i) data that enables the guest device to access the web service that provides access to control at least one of the one or more devices connected to the monitoring system of the property, and (ii) a temporary authentication token that is used to authenticate the guest device to control at least one of the one or more devices connected to the monitoring system of the property;

detecting, by the monitoring control unit, that the guest device is disconnected from the network within the property; and in response to detecting, by the monitoring control unit, that the guest device is disconnected from the network within the property, setting the temporary authentication token to have an expired status.

20. The non-transitory computer storage medium of claim 19, wherein the data that enables the guest device to access the web service includes a link to a secure website that provides access to at least one of the one or more devices connected to the monitoring system.

* * * * *